United States Patent
Svejkovsky et al.

(10) Patent No.: US 11,358,801 B2
(45) Date of Patent: Jun. 14, 2022

(54) DIFFERENTIAL IMPULSE CONVEYOR

(71) Applicants: Paul Blake Svejkovsky, Flower Mound, TX (US); Jason Lee Danner, Lantana, TX (US)

(72) Inventors: Paul Blake Svejkovsky, Flower Mound, TX (US); Jason Lee Danner, Lantana, TX (US)

(73) Assignee: Paul Blake Svejkovsky, Flower Mound, TX (US)

( * ) Notice: Subject to any disclaimer, the term of this patent is extended or adjusted under 35 U.S.C. 154(b) by 243 days.

(21) Appl. No.: 16/900,469

(22) Filed: Jun. 12, 2020

(65) Prior Publication Data

US 2021/0387810 A1  Dec. 16, 2021

(51) Int. Cl.
 *B65G 27/32* (2006.01)
 *B65G 27/30* (2006.01)
 *B65G 43/08* (2006.01)

(52) U.S. Cl.
 CPC ............. *B65G 27/30* (2013.01); *B65G 27/32* (2013.01); *B65G 43/08* (2013.01); *B65G 2203/0283* (2013.01); *B65G 2203/043* (2013.01); *B65G 2203/044* (2013.01); *B65G 2812/0308* (2013.01)

(58) Field of Classification Search
 CPC ...... B65G 25/065; B65G 27/30; B65G 27/32; B65G 2812/0308
 See application file for complete search history.

(56) References Cited

U.S. PATENT DOCUMENTS

| | | | | | |
|---|---|---|---|---|---|
| 3,817,370 | A | * | 6/1974 | Cox | B65G 27/30 198/609 |
| 5,178,258 | A | * | 1/1993 | Smalley | B65G 27/30 198/750.8 |
| 5,615,763 | A | * | 4/1997 | Schieber | B65G 27/32 198/770 |
| 5,850,906 | A | * | 12/1998 | Dean | B65G 27/32 198/750.1 |
| 5,944,170 | A | * | 8/1999 | LaVeine | B65G 27/32 198/764 |

(Continued)

OTHER PUBLICATIONS

International Search Report and the Written Opinion of the International Searching Authority; (ISA) International Searching Authority, dated Aug. 30, 2021.

*Primary Examiner* — Joseph A Dillon, Jr.
(74) *Attorney, Agent, or Firm* — Patrick K. Steele (57) ABSTRACT

A differential impulse conveyor system including detectable markers disposed in a series on a moving component of the conveyor system. A stationary sensor disposed in close proximity to the markers generates a signal when the moving component is in a first range of motion to dispose the markers proximal to the sensor, and the sensor either fails to generate a signal when the moving component is not within the first range of motion. The sensor signal causes a current conditioning device to condition current from a current source to operate a motor to power the conveyor tray at a first rate of acceleration in a first mode, and the lack of the signal causes the current conditioning device to operate the motor to power the conveyor tray at a second rate of acceleration in a second mode. Markers may be positionable to optimize the timing of the current modes.

20 Claims, 5 Drawing Sheets

(56) References Cited

U.S. PATENT DOCUMENTS

| | | | | |
|---|---|---|---|---|
| 5,979,640 | A * | 11/1999 | Horton | B65G 27/32 198/752.1 |
| 6,179,117 | B1 * | 1/2001 | Gilman | B65G 27/30 198/761 |
| 6,298,978 | B1 * | 10/2001 | Rosenstrom | B65G 27/32 198/753 |
| 6,415,911 | B1 * | 7/2002 | Svejkovksy | B65G 27/12 198/750.1 |
| 6,464,070 | B1 * | 10/2002 | Morinaka | B65G 43/08 198/761 |
| 6,675,955 | B2 * | 1/2004 | Nasser-Moghaddassi | B65G 27/24 198/769 |
| 7,216,757 | B1 * | 5/2007 | Patterson | B65G 27/30 198/764 |
| 7,387,198 | B2 * | 6/2008 | Thomson | B65G 27/32 198/760 |
| 7,650,986 | B2 * | 1/2010 | Kwasniewicz | B65G 27/32 198/750.8 |
| 8,561,788 | B2 * | 10/2013 | Knodell, Jr. | B65G 27/04 198/750.2 |
| 9,126,765 | B2 * | 9/2015 | Groenewald | B65G 27/12 |
| 9,897,179 | B2 * | 2/2018 | Danner | F16H 21/365 |
| 10,131,503 | B2 * | 11/2018 | Danner | F16H 37/124 |
| 10,322,882 | B1 * | 6/2019 | Trestain | B65G 27/12 |
| 10,683,175 | B1 * | 6/2020 | Lease | B65G 27/32 |
| 10,989,476 | B2 * | 4/2021 | Hammerich | F27B 7/383 |
| 11,046,528 | B2 * | 6/2021 | Olmstead | B65G 27/34 |
| 2007/0017783 | A1 * | 1/2007 | Kwasniewicz | B65G 27/12 198/751 |
| 2009/0229890 | A1 * | 9/2009 | Sugioka | G01G 19/16 198/575 |
| 2011/0083944 | A1 * | 4/2011 | Bonn | B65G 27/20 198/766 |
| 2013/0048470 | A1 * | 2/2013 | Knodell, Jr. | B65G 27/30 198/750.1 |
| 2015/0336745 | A1 * | 11/2015 | Groenewald | B65G 27/12 198/750.1 |
| 2016/0107841 | A1 * | 4/2016 | Spaulding | B65G 27/02 198/759 |
| 2018/0009608 | A1 * | 1/2018 | Danner | E05F 15/603 |
| 2018/0010672 | A1 * | 1/2018 | Danner | F16H 19/02 |

* cited by examiner

DIFFERENTIAL IMPULSE CONVEYOR

BACKGROUND

Field of the Invention

The present invention relates to a differential impulse conveyor used for conveying articles from a first location to a second location separated from the first location. More specifically, the present invention relates to a differential impulse conveyor having a reciprocating tray powered by a variable speed electric motor, the differential impulse conveyor having a movable counterweight assembly having a center of gravity aligned with the center of gravity of the conveyor tray.

Background of the Related Art

A differential impulse conveyor is a conveyor that moves articles by reciprocating an elongate conveyor tray on which the articles are placed. The conveyor tray moves in a first direction at a first rate of acceleration, then reverses the direction of movement and moves in the second, opposite direction at a second rate of acceleration that is greater than the first rate of acceleration. The first rate of acceleration is selected to prevent slippage of the articles on the conveyor tray so that the articles move along with the conveyor tray in the first direction. The second rate of acceleration, which is greater than the first rate of acceleration in absolute terms (i.e., it is in the opposite direction), is selected to cause the articles on the conveyor tray to slip or slide on the conveyor tray as the conveyor tray returns to its original position. Repeating this cycle of movement causes the articles to move along the conveyor tray in the first direction. The first rate of acceleration, the second rate of acceleration, and the stroke, or distance through which the conveyor tray reciprocates, may be optimized to produce a desired rate of travel of the articles being conveyed.

Some differential impulse conveyors use a motor that operates as a constant speed and an eccentrically mounted pulley or an angled universal joint connection to cyclically vary the speed of the mechanical (shaft) output to the conveyor tray.

BRIEF SUMMARY

One embodiment of the differential impulse conveyor of the present invention includes an electrically-driven motor having an output shaft that can be rotated by the motor at two different angular velocities, a reciprocatable conveyor tray for conveying articles therein, a first rotary to linearly reciprocating motion converter (disclosed in U.S. Pat. No. 10,131,503) coupled intermediate the output shaft of the electric motor and the conveyor tray, a reciprocatable counterweight assembly having a trough therein shaped to movably receive at least a portion of the conveyor tray therein, a second rotary to linear reciprocating motion converter coupled intermediate the output shaft of the electric motor and the counterweight assembly, at least one sensor which may be, for example, an optical sensor, a magnetic sensor and an electronic sensor, one or more detectable markers such as, for example, one or more optically detectable markers, one or more magnetically detectable markers, the one or more electronically detectable markers disposed on a moving surface of a component of the differential impulse conveyor such as, for example, but not by way of limitation, on the conveyor tray, on the counterweight assembly, or on either of the first or the second rotary to linearly reciprocating motion converter. These four components of some embodiments of the differential impulse conveyor of the present invention move in cyclical lockstep, and the movement of any one can be used, with one or more applied detectable markers and the sensor, to control the current conditioning device.

As discussed in more detail below, the movement of the conveyor tray in embodiments of the differential impulse conveyor of the present invention is advantageously controlled in a manner that enables increased efficiency, reduced manufacturing cost, and reduced maintenance cost as compared to conventional differential impulse conveyors. In addition, embodiments of the differential impulse conveyor of the present invention enable access to floorspace underneath the conveyor for better cleaning and sanitation.

One embodiment of the differential impulse conveyor of the present invention includes a variable frequency motor that changes between a first mode that produces a first rate of acceleration of the conveyor tray and a second mode that produces a second rate of acceleration of the conveyor tray in the opposite direction, the first rate of acceleration being less than the second rate of acceleration, in absolute terms. The first rate of acceleration causes the conveyor tray to move from an original conveyor tray position in a forward direction as the counterweight assembly moves from an original counterweight assembly position in the backward direction, opposite to the forward direction, and the second rate of acceleration, which is greater than the first rate of acceleration, causes the conveyor tray to move in the backward direction to return to the original conveyor tray position as the counterweight assembly moves in the forward direction to the original counterweight assembly position. The switching of the motor between the first mode and the second mode is converted into a linearly reciprocating motion of the conveyor tray and of the counterweight assembly, is the result of a change in the electrical current supplied to the motor. In one embodiment of the differential impulse conveyor of the present invention, the change in the electrical current to the motor that produces the first and second modes of operation is a change in the frequency of the electrical current.

In some embodiments of the differential impulse conveyor of the present invention, a current conditioning device may be used to condition electrical current to the motor to cause the motor to rotate at a first angular velocity for moving the conveyor tray at a first rate of acceleration in the first direction. The current conditioning device then conditions the current to cause the electric motor to rotate at a second angular velocity that is greater than the first angular velocity for moving the conveyor tray at a second rate of acceleration (in absolute terms) that is faster than the first rate of acceleration and in a second direction that is opposite to the first direction until the conveyor tray is restored to its original conveyor tray position. The current conditioning device must be synchronized with the differential impulse movement cycle of the conveyor tray and the counterweight assembly. That is, the current conditioning device must implement the change in the conditioning of the electrical current supplied to the drive motor at the exact moment that the conveyor tray is at its forwardmost position, which is at the end of the first mode of operation of the motor in which the conveyor tray is moved in the forward direction as the counterweight assembly is moved in the opposite direction. The current conditioning device then shifts to the second mode to produce a conditioned current that produces acceleration of the conveyor tray in the opposite direction. In one embodiment of the differential impulse conveyor of the present invention, the current conditioning device must switch between the first mode and the second mode at the exact moment that the conveyor tray is at forwardmost position, and from the second mode back to the first mode when the conveyor tray is at its rearwardmost position. In other embodiments of the differential impulse conveyor of the present invention, the current conditioning device may switch between the first mode and the second mode at a moment that is in advance of the conveyor tray reaching its forwardmost position, and from the second mode back to the first mode at a moment that is in advance of the conveyor tray reaching its rearwardmost position. This is a mechanical adjustment that is analogous to the spark advance that can be used to optimize the performance of an internal combustion engine having spark ignition of the combustible mixture received into a cylinder. Just as the spark advance, which may vary depending on the speed of the motor, optimizes the performance of the internal combustion engine at a given speed, the advance applied to the time at which the current conditioning device that conditions and feeds electrical current to an embodiment of the differential impulse conveyor of the present invention switches from the first mode to the second mode, or from the second mode back to the first mode, can be optimized to produce favorable performance and efficient movement of articles moved on the differential impulse conveyor for a given speed setting. The advance can be optimized to accommodate the lag or delay between the moment of change of the current to the electric motor that powers the movement of the conveyor tray and the counterweight assembly of an embodiment of the differential impulse conveyor of the present invention and the time at which such change begins to impact the characteristics of the movement of the conveyor tray and the counterweight assembly.

While the embodiment of the differential impulse conveyor of the present invention illustrated in the appended drawings shows the detectable markers disposed on the exterior surface of the first rotary to linear reciprocating motion converter, the markers could be disposed on another moving component of the differential impulse conveyor such as, for example, the second rotary to linear motion converter, the counterweight assembly or the conveyor tray. The movement of the differential impulse conveyor system of the present invention may be controlled by a sensor that detects the position of the conveyor tray by use of detectable markers disposed on a moving component of the conveyor system. The detectable markers can be disposed on a moving component and detected by the sensor when, for example, the conveyor tray reaches the optimal position, at which time the sensor detects a detectable marker, and it generates and sends a signal that shifts the current conditioning device to the second mode, and conditioned current to produce a greater rate of acceleration (in absolute terms) of the conveyor tray in the opposite direction. A row or series of detectable markers can be used to cause the sensor to continue generating and sending a signal to the current conditioning device to cause the current conditioning device to remain in the second mode. When the end of the row or series of detectable markers passes the sensor, the sensor will no longer detect a detectable marker and will cease generating and sending the signal to the current conditioning device, thereby causing the current conditioning device to return to the first mode, so that the conveyor tray will begin to slow and then to reverse direction and move again in the first direction at the first rate of acceleration.

In one embodiment of the differential impulse conveyor of the present invention, the detectable markers are disposed in a row on the conveyor tray and the sensor is disposed proximal to the conveyor tray to detect the row of detectable markers (or the absence thereof) when they are near (or remote from) the sensor. In one embodiment of the differential impulse conveyor of the present invention, the detectable markers are disposed in a row on the counterweight assembly and the sensor is disposed proximal to the counterweight assembly to detect the row of detectable markers (or the absence thereof) when they are near (or remote from) the sensor. In one embodiment of the differential impulse conveyor of the present invention, the detectable markers are disposed in a series on an exterior surface of the first rotary to linear reciprocating motion converter and the sensor is disposed proximal to the first rotary to linear reciprocating motion converter to detect the series of detectable markers on the first rotary to linear reciprocating motion converter (or the absence thereof) when they are near (or remote from) the sensor. In one embodiment of the differential impulse conveyor of the present invention, the detectable markers are disposed in a series on an exterior surface of the second rotary to linear reciprocating motion converter and the sensor is disposed proximal to the second rotary to linear reciprocating motion converter to detect the series of detectable markers on the second rotary to linear reciprocating motion converter (or the absence thereof) when they are near (or remote from) the sensor. The detectable markers can be placed in a row or in a series on any moving component of the embodiment of the differential impulse conveyor because the position of any movable component can serve as an indicator of the positions of other movable components that are mechanically linked thereto, and can therefore be strategically placed on any movable component to indicate to the sensor the optimal moment for shifting of the current conditioning device from the first mode to the second mode, or from the second mode to the first mode. A row of detectable markers can be placed on, for example, but not by way of limitation, the conveyor tray, the counterweight assembly (if any), or a belt, and a series of detectable markers can be placed on, for example, but not by way of limitation, a rotating component on one of the first rotary to linear reciprocating motion converter or the second rotary to linear reciprocating motion converter.

One advantage of some embodiments the differential impulse conveyor of the present invention having a sensor and detectable markers is that the electrical current that is supplied to the electric motor can be "toggled" between a first mode in which the electrical current to the motor has a first frequency that disposes the motor and the conveyor driven thereby in the first mode and a second mode in which the electrical current to the motor has a second frequency that disposes the motor and the conveyor driven thereby in the second mode. The sensor (for example, an optical sensor, a magnetic sensor or an electronic sensor) has parts and components that do not wear and are less likely to fail or require maintenance.

The sensor detects the row or a series of detectable markers, the sensor then generates a signal to the current conditioning device that causes the current supplied to the motor to be conditioned in a manner that shifts the operation of the conveyor from the first mode to the second mode. These types of drives can use a current conditioning device to change the speed of the output shaft rotation of the motor. Alternately, a servo-type motor can be used to control the change in speed from the first mode to the second mode, and back from the second mode to the first mode. Servo-type motors may be less efficient and more expensive than, for example, an alternating current motor or a permanent magnet motor used to create the change in rotational velocity with just the sensor/markers being used to toggle a simple inverter. In one embodiment of the differential impulse conveyor of the present invention, an Allen Bradley 525 model or Yaskawa may be used as the motor.

In one embodiment of the differential impulse conveyor of the present invention, the center of gravity of the counterweight assembly can be adjusted and can be thereby made to coincide with the center of gravity of the conveyor tray. The center of gravity of the conveyor tray or of the counterweight assembly is the point from which the weight of the conveyor tray or counterweight assembly may be considered to act. The center of gravity may also be referred to as the center of mass. This alignment of the centers of gravity of these two counter-moving objects (the conveyor tray and the counterweight assembly) reduces or eliminates the impulse moment that would otherwise be generated each time that the counterweight assembly and the conveyor tray are accelerated or decelerated in opposite directions by operation of the electric motor acting through the rotating output shaft. In one embodiment of the differential impulse conveyor of the present invention, the center of gravity of the conveyor tray and/or of the counterweight assembly may be modified by adding or removing, and by positioning and securing removable weights thereon, to make the center of gravity and/or the mass of the conveyor tray and/or counterweight assembly coincide with the to the center of gravity and/or mass of the conveyor tray. This arrangement reduces the strength and durability requirements for the support structure on which the first rotary to linear reciprocating motion converter, the second rotary to linear differential motion converter and the motor of the differential impulse conveyor are supported, and it reduces the wear and tear on structural components of the differential impulse conveyor which may result in lower maintenance. Another advantage of using the first rotary to linear reciprocating motion converter to move the conveyor tray and the second rotary to linear reciprocating motion converter to move the counterweight assembly, if any, is that there is no rise and fall of either of the converter tray or the counterweight assembly because there are no pivoting support legs disposed intermediate the conveyor tray or the counterweight assembly and the floor of the facility (or other support structure).

One advantage of some embodiments of the differential impulse conveyor of the present invention is that the reduced or eliminated impulse moment obtained by adjusting the center of gravity and/or the mass of the conveyor tray and/or the counterweight assembly allows the components of the differential impulse conveyor to be supported with less robust structures that cost less to manufacture and assemble. In addition, the less robust structures that are required enables more thorough cleaning around and underneath components of the conveyor because the less robust structures require less of a footprint and less mechanical bulk.

Another advantage of some embodiments of the differential impulse conveyor of the present invention is that a conventional motor that is powered by a standard alternating electrical current (AC) can be used. This is advantageous because it lowers the cost of the conveyor as compared to conveyors that might use more expensive servo motors. In some embodiments, a permanent magnet motors have also been used which improve on the efficiency and size compared to standard alternating current motors and greatly reduce the cost and complexity of servo motors.

DETAILED DESCRIPTION

Figure 1:
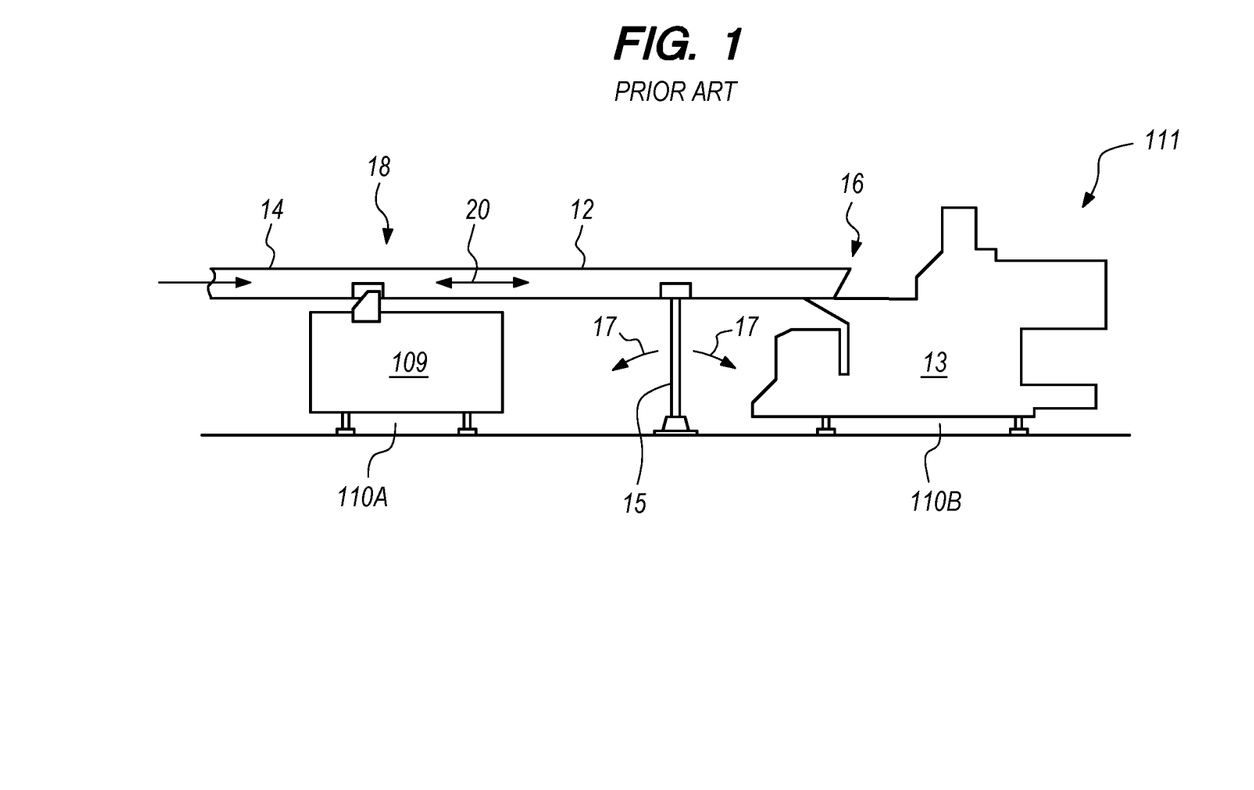
FIG. 1 is an elevation view of a prior art differential impulse conveyor system with a conventional floor-supported conveyor drive system.

FIG. 1 is an elevation view of a prior art differential impulse conveyor system 111 with a conventional floor-supported conveyor drive system 109. The prior art differential impulse system 111 of FIG. 1 further includes a conveyor tray 12 having a first end 14, a second end 16 and a trough 18 within the conveyor tray 12 for receiving and conveying articles (not shown) from the first end 14 to the second end 16 where the articles are discharged to a downstream station 13 such as, for example, a flavoring station at which seasoning or other flavoring agents are added in a predetermined weight percentage amount. The conveyor 12 is reciprocated horizontally as indicated by the double-headed arrow 20 by the floor-supported conveyor drive system 109.

The floor-supported conveyor drive system 109 of the prior art differential impulse conveyor system 111 of FIG. 1 creates an amount of floor space 110A that is, like the adjacent floor space 110B underneath the downstream station 13, very difficult to access and, therefore, very difficult to clean and sanitize. The limited accessibility caused by conventional floor-supported conveyor drive systems presents a problem where the conveyor system 111 is used to convey edible goods. Also, the prior art differential impulse system 111 includes a pivoting support 15 that causes the conveyor tray 12 to rise and fall with each cycle as the pivoting support 15 moves as indicated by the arrows 17.

Figure 2:
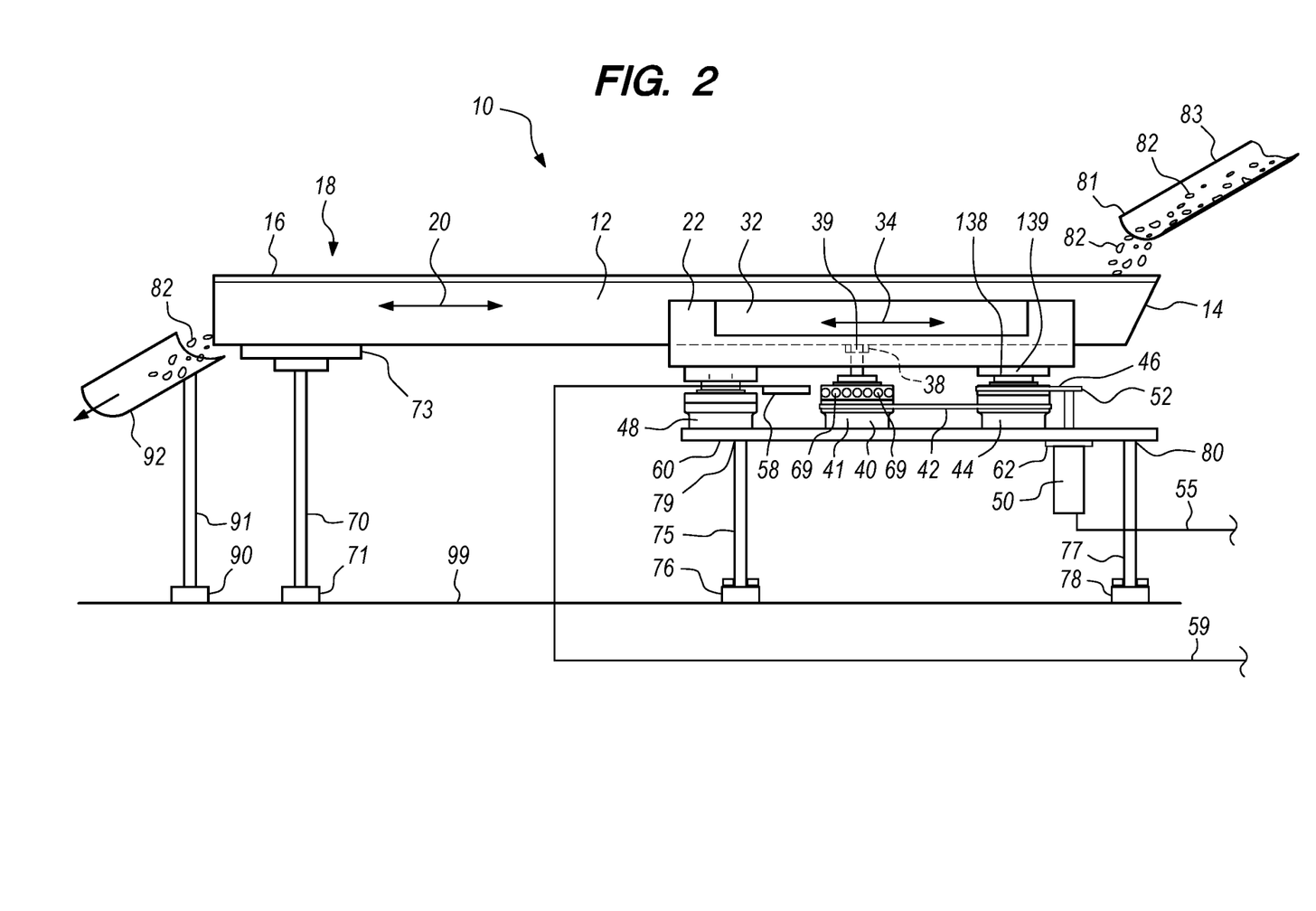
FIG. 2 is an elevation view of an embodiment of a differential impulse conveyor system of the present invention.

FIG. 2 is an elevation view of an embodiment of a differential impulse conveyor system 10 of the present invention. The embodiment of the differential impulse conveyor 10 of FIG. 2 includes an elongate conveyor tray 12 having a first end 14, a second end 16, a trough 18 (not shown) therein to support goods or articles (not shown) moved using the differential impulse conveyor 10, the conveyor tray 12 being linearly reciprocatable forward (towards the second end 16) and backward (towards the first end 14) as indicated by the double-headed arrow 20 shown on the conveyor tray 12. The embodiment of the differential impulse conveyor 10 of FIG. 2 further includes a counterweight assembly 22 that is linearly reciprocatable backward (towards the second end 16) and forward (towards the first end 14) as indicated by the double-headed arrow 34 shown on the counterweight assembly 22. The counterweight assembly 22 of FIG. 2 includes weights 32 that are removably securable to the counterweight assembly 22. Adding or removing removably securable weights 32 enables the user of the embodiment of the differential impulse conveyor 10 to adjust the center of gravity (not shown) and the mass of the counterweight assembly 22. Adjusting the center of gravity and the mass of the counterweight assembly 22 by removing or adding weights 32 allows the user to minimize or eliminate impulse moments cyclically developed as a result of the acceleration of the conveyor tray 12 and the counterweight assembly 22 in opposite directions during operation of the differential impulse conveyor 10, as will be discussed further below. The removably securable weights 32 may be secured to the counterweight assembly 22 using fasteners (not shown) such as conventional screws, bolts, nuts or clips, or by having prefabricated receptacles or pockets disposed on the counterweight assembly 22.

The embodiment of the differential impulse conveyor 10 of FIG. 2 further includes an electric motor 50 having a conductive cable 55 for conducting electrical current to the motor 50, the motor 50 being secured to a support structure 60 and intercoupled through a first belt 42 with a first rotary to linear reciprocating motion converter 40 that converts the rotary motion of the output shaft 52 to a linearly reciprocating motion that moves the conveyor tray 12. The motor 50 also drives and is intercoupled through the second belt 46 with a second rotary to linear reciprocating motion converter 44 that converts the rotary motion of the output shaft 52 to linearly reciprocating motion that moves the counterweight assembly 22 in opposition to the conveyor tray 10. In the embodiment of the differential impulse conveyor 10 of FIG. 2, the motor 50 is intercoupled with the first rotary to linear reciprocating motion converter 40 through the first belt 42 and the second belt 46, and the motor 50 is intercoupled with the second rotary to linear reciprocating motion converter 44 through the first belt 42 and the second belt 46. However, in other embodiments, the motor 50 may be intercoupled with the first rotary to linear reciprocating motion converter 40 and also to the second rotary to linear reciprocating motion converter 44 directly, or the motor 50 may be intercoupled to the first rotary to linear reciprocating motion converter 40 and the second rotary to linear motion converter 44 through other arrangements of belts, chains or gears, etc.

The first rotary to linear reciprocating motion converter 40 of FIG. 2 has an exterior surface 41 to which a plurality of detectable markers 69 have been secured in a row or a series. The row or series of detectable markers 69 are shown disposed on the exterior surface 41 of the first rotary to linear reciprocating motion converter 40 to extend about one-half of the circumference of the exterior surface 41 of the first rotary to linear motion converter 40. A sensor 58 is disposed proximal to the exterior surface 41 of the first rotary to linear reciprocating motion converter 40 to detect the detectable markers 69 as the motor 50 operates to rotate the first rotary to linear reciprocating motion converter 40 relative to the sensor 58. The sensor 58 generates a signal 59 to a current conditioning device (not shown in FIG. 2) to be discussed in more detail herein below. The signal 59 generated by the sensor 58 may, in some embodiments, be delivered to a current conditioning device (not shown) by way of, for example, but not by way of limitation, a conductive wire, a fiber optic cable, or wirelessly.

The first rotary to linear reciprocating motion converter 40 is intercoupled intermediate the motor 50 and the conveyor tray 12 and the second rotary to linear reciprocating motion converter 44 is intercoupled intermediate the motor 50 and the counterweight assembly 22. The conveyor tray 12 includes a conveyor tray coupling 38 having a receptacle 39 through which the first rotary to linear reciprocating motion converter 40 is coupled to the conveyor tray 12. The counterweight assembly 22 includes a counterweight assembly coupling 138 having a receptacle 139 through which the second rotary to linear reciprocating motion converter 44 is coupled to the counterweight assembly 22.

The first rotary to linear reciprocating motion converter 40 and the second rotary to linear reciprocating motion converter 44 operate 180 degrees (3.14 radians) out of phase one with the other so that the linear reciprocation of the conveyor tray 12 and the opposed linear reciprocation of the counterweight assembly 22 are maintained in an opposing relationship to balance the impulse moments generated when these components are accelerated by operation of the motor 50. Stated another way, as the conveyor tray 12 is accelerated by the motor 50 towards the second end 16 of the conveyor tray 12, the counterweight assembly 22 is accelerated towards the first end 14 of the conveyor tray 12, and as the conveyor tray 12 is accelerated by the motor 50 towards the first end 14 of the conveyor tray 12 to return to its original position, the counterweight assembly 22 is accelerated towards the second end 16 of the conveyor tray 12 to return to its original position. This arrangement balances the forces applied by the motor 50, the first rotary to linear reciprocating motion converter 40 and the second rotary to linear reciprocating motion converter 44 to the conveyor tray 12 and the counterweight assembly 22, respectively. The removably securable weights 32 on the counterweight assembly 22 may be added or removed to fine tune the balancing impulse moment balancing between these reciprocating components of the differential impulse conveyor 10. Alternately, removably securable weights 32 may be disposed on the conveyor tray 12, or removably securable weights 32 may be disposed on the conveyor tray 12 in addition to the counterweight assembly 22.

The motor 50, the first rotary to linear reciprocating motion converter 40 and the second rotary to linear reciprocating motion converter 44, and the components of the differential impulse conveyor 10 that are supported by the first rotary to linear motion converter 40 and/or the second rotary to linear motion converter 44, are supported by a structural support 60 which is, in turn, supported above a support surface or floor 99 by a proximal support 77 and a distal support 75. The proximal support 77 may be secured to the floor 99 at a proximal flange 78 and the distal support 75 may be secured to the floor 99 at a distal flange 76. The balancing of the center of gravity and/or the masses of the conveyor tray 12 and the counterweight assembly 22 can dramatically reduce or eliminate the amount of the forces cyclically applied to the proximal support 77 and the proximal flange 78 and to the distal support 75 and the distal flange 76 during operation of the differential impulse conveyor 10, and also reduces or eliminates torque cyclically applied to the connection 80 between the proximal support 77 and the support structure 60 and the connection 79 between the distal support 75 and the support structure 60.

As can be seen in FIG. 2, the differential impulse conveyor 10 can be used to receive a stream of goods 82 discharged from a distal end 81 of a supply conveyor 83 to the first end 14 of the conveyor tray 12, to convey that stream of goods 82 to the second end 16 of the conveyor tray 12, and to discharge that stream of goods 82 to a discharge conveyor 92. The differential impulse conveyor 10 may be used to convey a stream of goods 82 to a process or a station such as, for example, but not by way of limitation, a flavoring station at which flavoring agents are added to the goods 82, a bagging machine where the goods 82 are bagged or packaged, a weighing apparatus, or to any of a number of other processes or stations within a facility that houses the differential impulse conveyor 10.

The differential impulse conveyor 10 of FIG. 2 further includes a counterweight assembly linear bearing 48 that supports and allows linear reciprocation of the counterweight assembly 22 as it is reciprocated by operation of the motor 50. The differential impulse conveyor 10 of FIG. 2 further includes a conveyor tray linear bearing 73 that supports and allows linear reciprocation of the conveyor tray 12 as it is reciprocated in opposition to the counterweight assembly 22 by operation of the same motor 50. The linear bearing 48 appears in FIG. 2 to be very similar to the first rotary to linear reciprocating motion converter 40 and to the second rotary to linear reciprocating motion converter 44. This similarity is because the first rotary to linear reciprocating motion converter 40 and to the second rotary to linear reciprocating motion converter 44 are similar in structure to the linear bearing 48, the difference being that the dimensions of the components of the linear bearing 48 are such that the range of movement of the counterweight assembly 22 is insufficient to cause the linear bearing 48 to reach its extreme range of movement in either direction of reciprocation, thereby preventing the linear bearing 48 from binding or becoming bound at its extreme range of movement. This adaptation of what would otherwise be structured as a rotary to linear reciprocating motion converter of U.S. Pat. No. 10,131,503, and can be understood further by review of U.S. Pat. No. 9,879,179. In a preferred embodiment, a single electric motor 50 is connected and timed to the first rotary to linear reciprocating motion converter 40 and the second rotary to linear reciprocating motion converter 44 using a timing belt. However, in another embodiment of the present invention includes two separate motors 50, one for driving the first rotary to linear reciprocating motion converter 40 which, in turn, drives the conveyor tray 12, and the other for driving the second rotary to linear reciprocating motion converter 44 which, in turn, drives the counterweight assembly 22 (if any). Using a common current conditioner to drive the two motors provides for timing of one motor 50 with the other motor 50 which, in turn, times the conveyor tray 12 with the counterweight assembly 22. Although the counterweight assembly 22 reduces stresses on components of an embodiment of the conveyor system 111 of the present invention, some embodiments do not include a counterweight assembly 22 and, in other embodiments, the counterweight assembly 22 is of a kind other than that disclosed herein.

Figure 3:
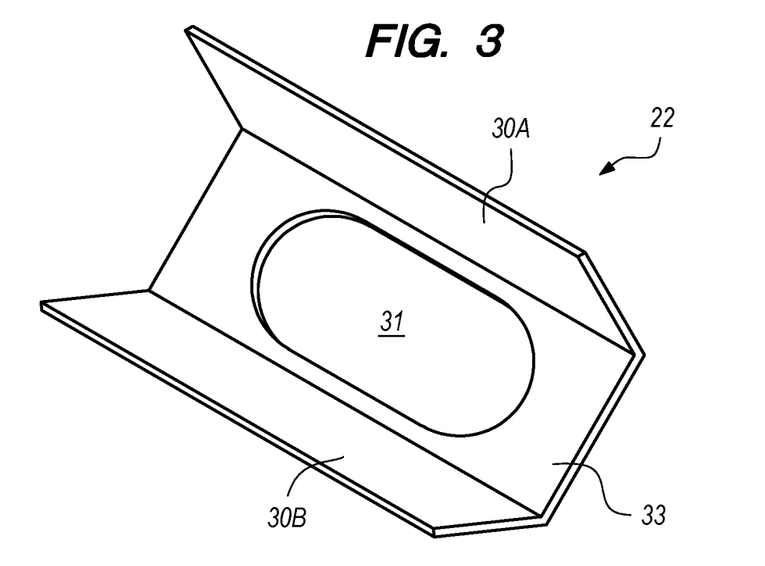
FIG. 3 is a perspective view of the trough of a counterweight assembly of the embodiment of the differential impulse conveyor system of FIG. 2.

FIG. 3 is a perspective view of the counterweight assembly 22 of the embodiment of the differential impulse conveyor 10 of FIG. 2. The floor 33 of the counterweight assembly 30 is disposed intermediate a first side panel 30A and a second side panel 30B of the counterweight assembly 22. The floor 33, the first side panel 30A and the second side panel 30B together form a trough within the counterweight assembly 22 to movably receive at least a portion of the conveyor tray 12 therein. The opening 31 in the floor 33 of the counterweight assembly 22 accommodates the first rotary to linear reciprocating motion converter 40 disposed intermediate the motor 50 and the conveyor tray 12 (not shown in FIG. 3—see FIG. 2), and is elongated in the direction of reciprocation of the counterweight assembly 22 to accommodate the reciprocating movement of the counterweight assembly 22 relative to the stationary (but rotating) first rotary to linear reciprocating motion converter 40 that reciprocates the conveyor tray 12.

Figure 4:
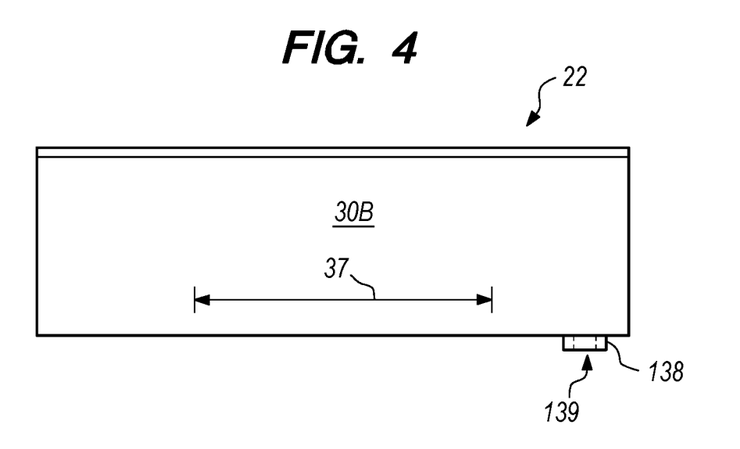
FIG. 4 is an elevation view of the counterweight assembly of FIG. 3.

FIG. 4 is an elevation view of the counterweight assembly 22 of FIG. 3, and shows a counterweight coupling 38 on the counterweight assembly 22, the counterweight coupling 138 having a receptacle 139 therein for engaging the first rotary to linear reciprocating motion converter 44 (not shown in FIG. 4—see FIG. 2). The optional removably securable weights 32 (see FIG. 2) are removed from the counterweight assembly 22 in FIG. 4 for clarity. The span 37 of the opening 31 in the floor 33 shown in FIG. 3 is shown by the double-headed arrow on the second side panel 30B of FIG. 4.

Figure 5:
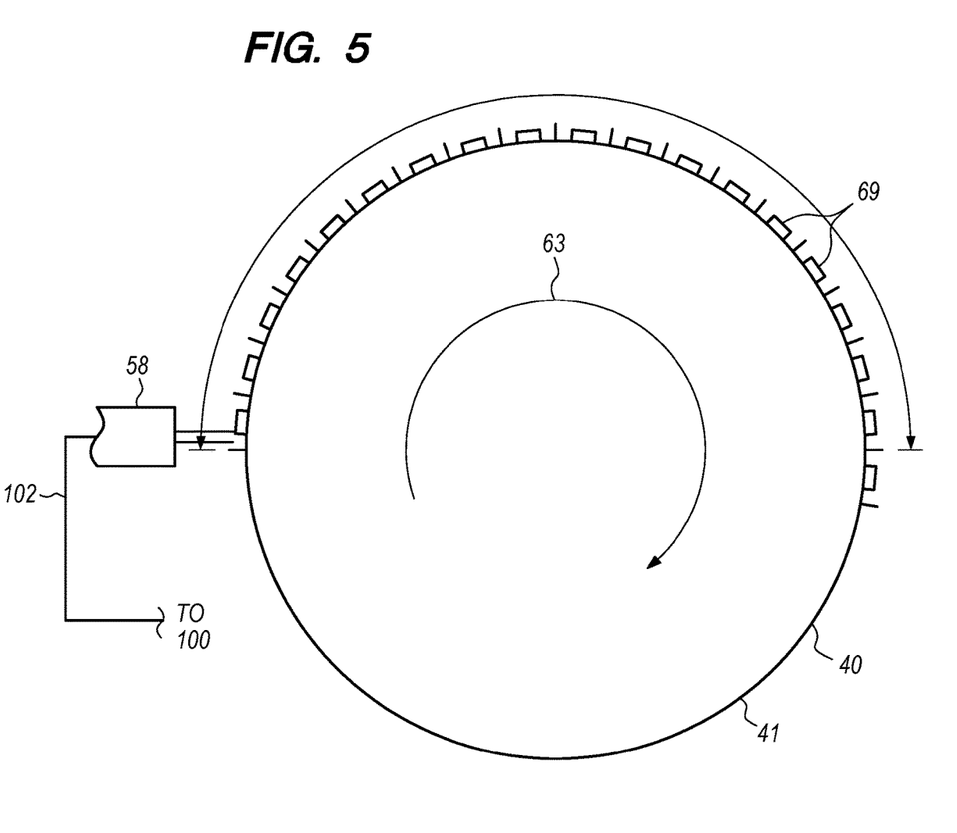
FIG. 5 is a plan view of an arrangement of one of an optically detectable, a magnetically detectable and an electronically detectable set of transponders coupled to the exterior surface of a rotary to linearly reciprocating motion converter and an adjacent sensor of the embodiment of the differential impulse conveyor of FIG. 2.

FIG. 5 is a plan view of an arrangement of a sensor 58 such as, for example, one of an optically detectable, a magnetically detectable and an electronically detectable set of detectable markers 69 coupled to the exterior surface 41 of the first rotary to linearly reciprocating motion converter 40. The sensor 58 is disposed adjacent to the first rotary to linearly reciprocating motion converter 40 to detect the presence of the markers 69 as the first rotary to linearly reciprocating motion converter 40 rotates in the direction of the arrow 63. The sensor 58 generates a signal 102 to the current conditioning device 100 that varies the frequency of the current 55 supplied to the motor 50. For example, the current 55 supplied to the motor 50 by the current conditioning device 100 may be provided to operate the motor 50 in a first mode when a marker 69 is in close proximity to the sensor 58 and the signal 102 (as illustrated in FIG. 2) is being generated by the sensor 58 and delivered to the current conditioning device 100 and the current 55 (see FIG. 2) supplied to the motor 50 by the current conditioning device 100 may be provided to operate the motor 50 in a second mode when a detectable marker 69 is not in close proximity (as will occur upon continued rotation of the first rotary to linear reciprocating motion converter 40 in the direction of the arrow 63) and the signal 102 is no longer being generated and delivered to the current conditioning device 100. In the embodiment of the current frequency control system illustrated in FIG. 5, the detectable markers 69 are disposed on about one-half (180 degrees or 3.14 radians) of the circumference of the exterior surface 41 of the first rotary to linear reciprocating motion converter 40 to thereby produce a current having a frequency switching between the first mode and the second mode to produce the "slow forward, fast back" motion of the conveyor tray 12 that moves goods along the conveyor tray 12 (not shown in FIG. 5).

Figure 6:
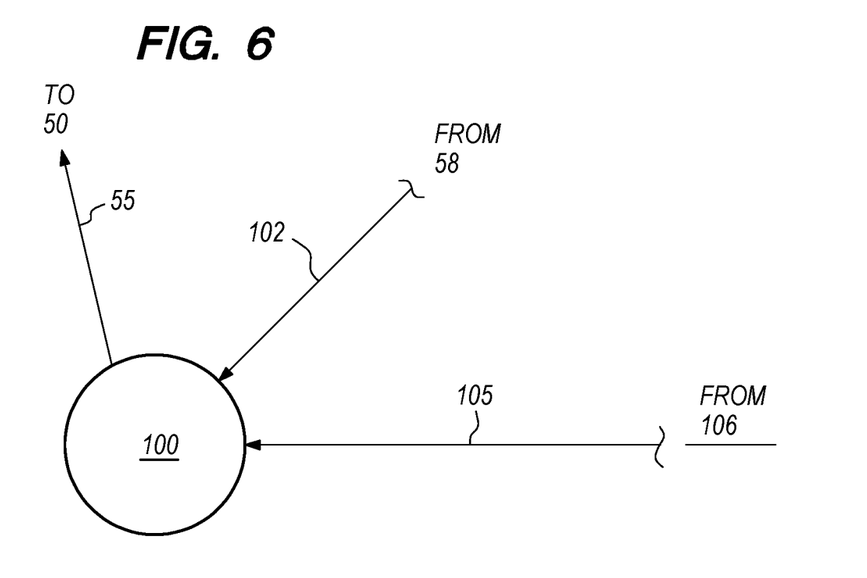
FIG. 6 is an illustration of an electrical current conditioning device control system of an embodiment of the differential impulse conveyor system of the present invention.

FIG. 6 is an illustration of a current conditioning control system that can be used to control the adjustments made to the electrical current that is provided to the electric motor 50. For the current frequency control system illustrated in FIG. 5, it may be said that the absence of a signal 102 being generated by the sensor 58 and delivered to the current conditioning device 100 (when no detectable marker 69 is in close proximity to the sensor 58) is itself, in effect, a second signal which is, in this case, a non-signal that causes the current conditioning device 100 to switch to the second mode. Alternately, in other embodiments of the differential impulse conveyor 10 of the present invention, a current frequency control system may sense two different rows or series of detectable markers 69, each row or series being of a different type of detectable markers 69 and each resulting in a different signal generated by the sensor 58. The (those) signal(s) 102 are delivered to the current conditioning device 100, a first signal 102 corresponding to operation of the motor 50 in the first mode and a second signal (not shown) corresponding the operation of the motor 50 in the second mode.

Electrical current 105 from a current source 106 is supplied to the current conditioning device 100. When a detectable marker 69 is detected in close proximity to the sensor 58, a signal 102 is generated by the sensor 58 and received by the current conditioning device 100, and the output conditioned current 55 to the motor 50 is of a frequency that causes the motor 50 to operate in the first mode. When no detectable marker 69 is detected (or, alternately, a second type of detectable marker is detected) in close proximity to the sensor 58, no signal 102 (or, alternately, a second signal distinct from the first signal) is generated by the sensor 58 and received by the current conditioning device 100, and the output conditioned current 55 to the motor 50 is of a frequency that causes the motor 50 to operate in the second mode. Where the conditioning of the current is an adjustment of the frequency, when a first signal 102 generated by the sensor 58 is received by the current conditioning device 100, the output conditioned current 55 to the motor 50 is of a frequency that causes the motor 50 to operate in the first mode, and when no signal 102 (or, alternately, a second signal distinct from the first signal) is generated by the sensor 58 is received by the current conditioning device 100, the output conditioned current 55 to the motor 50 is of a frequency that causes the motor 50 to operate in the second mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A differential impulse conveyor, comprising:
    an elongate conveyor tray movable in a forward direction at a first rate of acceleration and in a backward direction, opposite to the forward direction, at a second rate of acceleration that is greater than the first rate of acceleration, thereby moving goods along the tray in the forward direction, the tray having a first end, a second end, a trough therein for conveying goods, and a conveyor drive coupling;
    a counterweight assembly having a first side, a second side, a trough therebetween to receive at least a portion of the conveyor tray, and a counterweight drive coupling;
    an electrically powered motor having a rotating output shaft;
    a first rotary to linear reciprocating motion converter coupled intermediate the rotating output shaft of the motor and the conveyor drive coupling; and
    a second rotary to linear reciprocating motion converter coupled intermediate the rotating output shaft of the motor and the counterweight drive coupling;
    wherein operation of the motor causes the conveyor tray to move in the forward direction and the counterweight assembly to simultaneously move in the backward direction; and
    wherein continuing operation of the motor causes the conveyor tray to reverse direction and to move in the backward direction and the counterweight assembly to simultaneously move in the forward direction.

2. The differential impulse conveyor of claim 1, further comprising:
    a bearing coupling on the conveyor spaced apart from the conveyor drive coupling; and
    a linear bearing coupled to the bearing coupling to support the conveyor tray as it moves.

3. The differential impulse conveyor of claim 1, further comprising:
    a current conditioning device electrically coupled to the motor to condition a source of input electrical current, the current conditioning device having a first mode in which an output electrical current to the motor causes the motor operate at a first speed to move the conveyor tray in the forward direction and to move the counterweight assembly in the backward direction, and a second mode in which an output electrical current to the motor causes the motor to operate at a second speed that is greater than the first speed to move the conveyor tray in the backward direction and to move the counterweight assembly in the forward direction.

4. The differential impulse conveyor of claim 3, wherein the motor is a variable frequency drive motor.

5. The differential impulse conveyor of claim 4, further comprising:
    a position sensor to detect the position of the conveyor tray and to generate a signal to the current conditioning device;
    wherein the position sensor detects when the conveyor tray reaches a predetermined forward lateral position of the conveyor tray and generates a signal to switch the current conditioning device from the first mode to the second mode; and
    wherein the position sensor detects when the conveyor tray reaches a predetermined backward lateral position of the conveyor tray and generates a signal to switch the current conditioning device from the second mode to the first mode.

6. The differential impulse conveyor of claim 5, wherein the position sensor includes one of a mechanical detector, an optical detector, a magnetic detector and an electronic detector and a plurality of one of mechanical markers, optical markers, magnetic markers and electronic markers disposed on a moving component of the differential impulse conveyor.

7. The differential impulse conveyor of claim 6, wherein the plurality of one of the mechanical markers, optical markers, magnetic markers and electronic markers are disposed on an exterior surface of one of the first rotary to linear reciprocating motion converter and an exterior surface of the second rotary to linear reciprocating motion converter; and
wherein the one of a mechanical detector, an optical detector, a magnetic detector and an electronic detector is positioned adjacent to the one of the first rotary to linear reciprocating motion converter and an exterior surface of the second rotary to linear reciprocating motion converter proximal to the one of a mechanical markers, optical markers, magnetic markers and electronic markers.

8. The differential impulse conveyor of claim 7, wherein the plurality of one of optical markers, magnetic markers and electronic markers comprises a plurality of magnetic markers secured to the exterior surface of one of the first and second rotary to linear reciprocating motion converters; and
the one of a mechanical detector, an optical detector, a magnetic detector and an electronic detector comprises a magnetic detector.

9. The differential impulse conveyor of claim 1, further comprising:
a first support structure for supporting the motor, the first rotary to linear reciprocating motion converter and the second rotary to linear reciprocating motion converter, the first support structure having at least one vertical support member for supporting the conveyor tray and the counterweight assembly above a floor.

10. The differential impulse conveyor of claim 2, further comprising:
a second support structure for supporting a linear bearing coupled to the bearing coupling on the conveyor tray.

11. The differential impulse conveyor of claim 1, further comprising:
a plurality of weights removably securable to the counterweight assembly.

12. A differential impulse conveyor, comprising:
an elongate conveyor tray having a trough for movably supporting goods thereon;
a counterweight assembly having a trough for receiving a portion of the conveyor tray therein;
an electrically powered motor having a rotary output shaft;
a first rotary to linear reciprocating motion converter coupled intermediate the rotary output shaft of the motor and the conveyor tray;
a second rotary to linear reciprocating motion converter coupled intermediate the rotary output shaft of the motor and the counterweight assembly;
a current conditioner electrically coupled to the motor, the current conditioner having a first mode in which it conditions current to operate the motor at a first speed and a second mode in which it conditions current to operate the motor at a second speed that is greater than the first speed;
a plurality of markers secured to a moving component of the differential impulse conveyor; and
a sensor disposed proximal to the moving component to which the plurality of markers are secured, the sensor to generate a signal to the current conditioner to switch between the first mode and the second mode when the sensor detects one or more of the plurality of markers in close proximity to the sensor.

13. The differential impulse conveyor of claim 12, further comprising:
a plurality of weights removably securable to the counterweight assembly.

14. The differential impulse conveyor of claim 12, wherein the rotary output shaft of the motor is coupled to the first rotary to linear reciprocating motion converter using one of a belt, a chain and mating gears.

15. A differential impulse conveyor, comprising:
an elongate conveyor tray movable in a forward direction at a first rate of acceleration and in a backward direction, opposite to the forward direction, at a second rate of acceleration that is greater than the first rate of acceleration, thereby cyclically moving goods along the tray in the forward direction, the tray having a first end, a second end, a trough therein for conveying goods, and a conveyor drive coupling;
an electrically powered motor having a rotating output shaft;
a first rotary to linear reciprocating motion converter coupled intermediate the rotating output shaft of the motor and the conveyor drive coupling; and
a plurality of markers secured to a moving component of the differential impulse conveyor; and
a sensor disposed proximal to the moving component sensing movement of the plurality of markers; and
wherein operation of the motor causes the conveyor tray to move in the forward direction; and
wherein continuing operation of the motor causes the conveyor tray to reverse direction and to move in the backward direction.

16. The differential impulse conveyor of claim 15, further comprising:
a current conditioning device electrically coupled to the motor to condition a source of input electrical current, the current conditioning device having a first mode in which an output electrical current to the motor causes the motor operate at a first speed to move the conveyor tray in the forward direction and a second mode in which an output electrical current to the motor causes the motor to operate at a second speed that is greater than the first speed to move the conveyor tray in the backward direction.

17. The differential impulse conveyor of claim 16, wherein the motor is a variable frequency drive motor.

18. The differential impulse conveyor of claim 17, further comprising:
a position sensor to detect the position of the conveyor tray and to generate a signal to the current conditioning device;
wherein the position sensor detects when the conveyor tray reaches a predetermined forward position of the conveyor tray and generates a signal to switch the current conditioning device from the first mode to the second mode; and
wherein the position sensor detects when the conveyor tray reaches a predetermined backward position of the conveyor tray and generates a signal to switch the current conditioning device from the second mode to the first mode.

19. The differential impulse conveyor of claim 18, wherein the position sensor includes one of a mechanical detector, an optical detector, a magnetic detector and an electronic detector and a plurality of one of mechanical markers, optical markers, magnetic markers and electronic markers disposed on a moving component of the differential impulse conveyor.

20. The differential impulse conveyor of claim 19, wherein the plurality of one of the mechanical markers, optical markers, magnetic markers and electronic markers are disposed on an exterior surface of one of the first rotary to linear reciprocating motion converter and an exterior surface of the second rotary to linear reciprocating motion converter; and     wherein the one of a mechanical detector, an optical detector, a magnetic detector and an electronic detector is positioned adjacent to the one of the first rotary to linear reciprocating motion converter and an exterior surface of the second rotary to linear reciprocating motion converter proximal to the one of a mechanical markers, optical markers, magnetic markers and electronic markers.

\* \* \* \* \*